Figure 1:
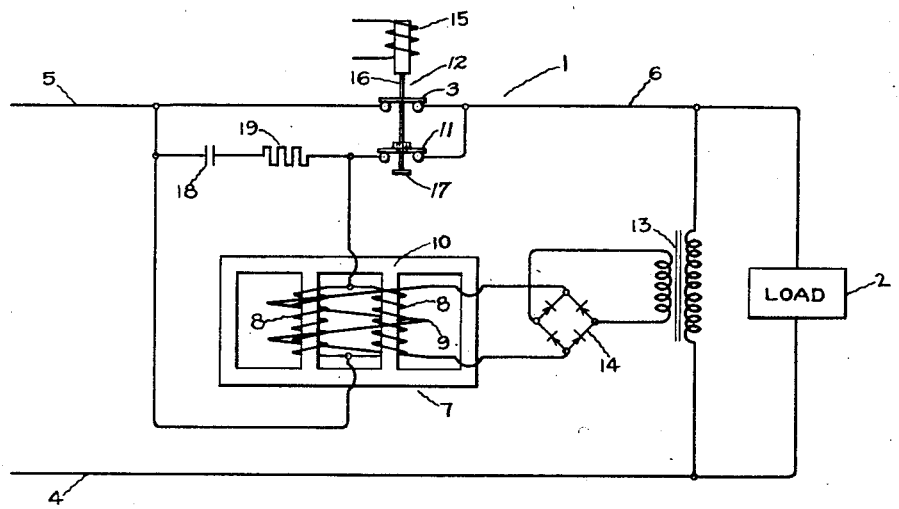

April 3, 1951   B. D. BEDFORD   2,547,614
SATURABLE REACTOR ARC PREVENTION CIRCUIT
Filed Sept. 24, 1948   2 Sheets-Sheet 1

Inventor:
Burnice D. Bedford,
by Ernest C. Britton
His Attorney.

April 3, 1951  B. D. BEDFORD  2,547,614
SATURABLE REACTOR ARC PREVENTION CIRCUIT
Filed Sept. 24, 1948  2 Sheets-Sheet 2

Inventor:
Burnice D. Bedford,
by Ernest C. Britton
His Attorney.

Patented Apr. 3, 1951

2,547,614

UNITED STATES PATENT OFFICE 2,547,614

SATURABLE REACTOR ARC PREVENTION CIRCUIT

Burnice D. Bedford, Schenectady, N. Y., assignor to General Electric Company, a corporation of New York Application September 24, 1948, Serial No. 50,955

6 Claims. (Cl. 175—294)

This invention relates to saturable reactors, and more particularly to saturable reactors as an aid in switching.

The physical and electrical properties of saturable core reactors are well known. In essence, a saturable core reactor is merely an ordinary reactor having at least one direct current exciting coil so that a predetermined flux density or degree of saturation of the reactor core may be established. Therefore, if the flux induced within the core of the reactor is sufficient to cause saturation the impedance of the reactor may be quite small as compared to the reactor impedance when the core is unsaturated. By controlling the direct current which flows through the saturating coil or coils the impedance of the reactor may be adjusted within a predetermined range.

In power circuits the interruption or the opening of switches carrying high currents produces arcing which results in the burning and scarring of contact surfaces. Obviously, this is undesirable as it necessitates constant switch maintenance and replacement of contact surfaces. Thus, it would be advantageous to be able to interrupt high current circuits without establishing a destructive arc. This invention prevents arcing in switching operations by utilizing the previously mentioned characteristic of saturable core reactors, that of impedance being a function of core saturation. A saturable core reactor whose alternating current windings are of sufficient rating to withstand, for a short time, the full load current which is to be interrupted, is connected, originally in series with the load. The saturating winding of the reactor is excited from a rectifier whose source is a transformer connected, in one particular form of the invention, across the alternating current load. Thus, the direct current through the exciting winding of the reactor is dependent upon the alternating current voltage across the load. In normal operation the reactor is short circuited by a switch. When this switch is first opened to interrupt the current to the load an additional impedance in the form of the saturable core reactor is added to the circuit. The drop in load voltage due to this added impedance is manifest, through the action of the transformer and rectifier, in an increase in reactor impedance. This increase in reactor impedance progresses until the unsaturated impedance of the reactor is in series with the load at which time the reactor and load circuit may be completely opened without danger of arcing.

It is an object of this invention to provide a switching system particularly applicable for handling high currents which incorporates in it a saturable core reactor.

Another object of this invention is to provide a new and simple means for allowing switches of low current rating to be utilized in higher current circuits.

Still another object of this invention is to provide new and improved switching means which will permit a decrease in switch maintenance costs.

The invention will be better understood from the following description taken in connection with the accompanying drawings, and its scope will be pointed out in the appended claims.

Figure 2:
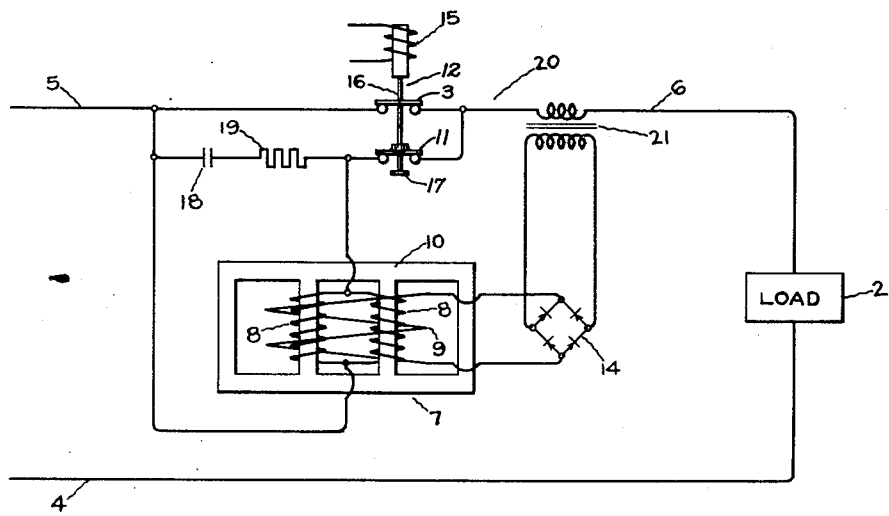
Figure 3:
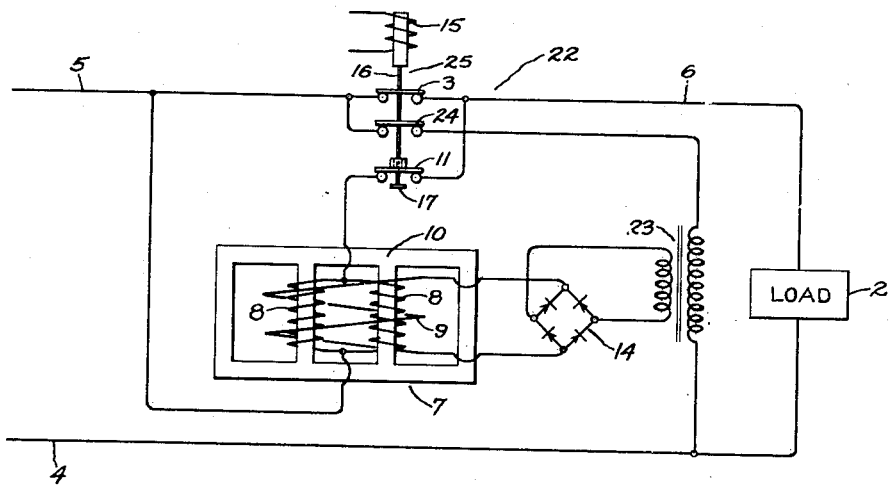

In the drawings, Fig. 1 is a circuit diagram of a particular embodiment of the invention; Fig. 2 is a circuit diagram of an alternative construction of the invention. Fig. 3 is a circuit diagram of another alternative construction of the invention.

Referring now to the drawing, there is shown in Fig. 1 by way of example, a circuit 1 having a load 2 conductively connected through a switch 3 to the leads 4, 5 and 6. The leads 4 and 5 are coupled to a power source which is not shown in the figures. Normally, when the switch 3 is opened the circuit to the load 2 is broken and if the load current is high an arc will be drawn between the switch contact surfaces. In order to eliminate the arc or decrease its intensity or duration to a point where the damage caused by it is negligible, a saturable core reactor 7 having alternating current windings 8 and a direct current saturating winding 9 wound on a magnetic core 10 may have the alternating current windings 8 serially connected with another switch 11. This combination of reactor windings 8 and switch 11 is coupled in parallel with the switch 3. It can be seen from the drawing that when the switches 3 and 11 are closed the alternating current windings 8 of the reactor 7 are short circuited; when the switch 3 is open and the switch 11 is closed the windings 8 are in series with the load 2 and when both switches 3 and 11 are open no power is delivered to the load 2.

The switches 3 and 11 may be incorporated in a unit 12 similar to the one illustrated in Figs. 1 and 2 wherein the sequential operation of the switches, switch 3 opening before switch 11, is assured.

In Fig. 1 a transformer 13 is placed across the load 2 and its secondary winding supplies a rectifier 14, which in turn provides the direct current excitation for the saturating coil 9 of the reactor 7. It can be seen that the current within the coil 9 is dependent upon the voltage across the load 2, and the degree of saturation of the magnetic core 10 is therefore dependent upon the load voltage.

Assume that the switches 3 and 11 are closed. Thus, the current flows through the lead 5, through the switch 3, the lead 6, the load 2 and the lead 4, effectively removing the saturable core reactor 7 from the circuit. It is desired to interrupt or open the circuit to the load 2. By energizing, in the illustrated cases, a solenoid 15, from a source not shown, the switch 3 which is fixed to the movable shaft 16 of the switching unit 12 is opened, but the switch 11 does not open immediately. Thus, the reactor 7 is placed in series with the load 2. It is to be remembered that a certain specific value of direct current is flowing through the saturating coil 9 of the reactor 7 and this value is dependent upon the voltage across the load 2 which is also the voltage across the transformer 13. Since the reactor 7, no matter how saturated its core 10 may be, has a certain impedance there is a voltage drop through it, and the voltage across the load 2 and the transformer 13 is decreased. This in turn decreases the current through the transformer 13, the rectifier 14 and the saturating coil 9. As the saturating current decreases, the degree of saturation of the reactor core 10 decreases, increasing the impedance of the reactor 7. When the impedance increases the voltage drop due to the presence of the reactor 7 in the circuit increases, and again the voltage across the load 2 and the transformer 13 decreases. This in turn results in a further decrease of direct current excitation of the core 10 and, therefore, a further increase in the inductive impedance of the reactor 7. As the impedance of the reactor 7 increases the total load connected between leads 4 and 5 is increased and, assuming a constant potential source, the load current is decreased. With proper adjustment of the impedance of the reactor 7 the load current may be decreased to a point where the switch 11 may be opened without danger of producing an arc. A delayed opening mechanism is incorporated in the unit 12 which allows a predetermined time to elapse after the opening of switch 3 before switch 11 operates. It is shown in the drawings by a plate 17 secured to the movable shaft 16 and which engages the switch 11. A capacitance 18 and a resistance 19 which are serially connected have been introduced in parallel with the reactor 7 to absorb the initial transients present when the switch 3 is first opened.

A circuit 20 similar to the circuit 1 shown in Fig. 1 is illustrated in Fig. 2, but in this case instead of the direct current excitation of the saturable reactor 7 being dependent upon the voltage across the load 2, it is dependent upon the current through the load. Again the reactor 7 is placed in series with the load 2 but it is short circuited by the switch 3. When the switch 3 is first opened the reactor 7 is placed in series with the load 2. This causes a decrease in direct current through the saturating winding 9 by the action of a current transformer 21 and a rectifier 14. The decrease in direct current excitation causes a further increase in the inductive impedance of the reactor 7 which in turn causes a decrease in the load current. This action is cumulative until the load current has been decreased to a point where the switch 11 may be opened without danger of arcing.

It can be seen that in embodiments of the invention, illustrated in Figs. 1 and 2, even though in one case a voltage transformer and in the other a current transformer is used to control the direct current through the saturating winding 9, the output of the transformers may be considered to be responsive to the amount of reactor impedance in series with the load 2; the greater the impedance of reactor 7 the smaller will be the output of the transformers.

In the circuit 22, shown in Fig. 3, the output of the transformer 23 is not a function of the impedance of the reactor 7. In this embodiment of the invention a third switch, 24, has been added to the switches 3 and 11 in a switching unit 25. Again the load 2 is conductively coupled to the power leads 4 and 6, and the lead 6 is connected to the lead 5 through the switch 3; the alternating current coils 8 of the saturable reactor 7 are serially connected to the switch 11 and the coils 8 and switch 11 are coupled in parallel with the switch 3. The transformer 10 is connected in parallel with load 2 through the switch 24.

Thus, it can be seen that when the switches 3, 24, and 11 are closed the reactor 7 is shunted by the switch 3 and the load 2 is coupled directly to the source through the leads 4 and 5. Since the switch 24 is closed direct saturating current flows through the coil 9 of the reactor 7 causing the core 10 to be highly saturated. This results in a low impedance of the saturable core reactor 7. The saturating current is supplied from the rectifier 14 which is coupled to the secondary of the transformer 23.

It is desired to remove the load 2 from the line with a minimum of arcing. To do this, in the illustrated case shown in Fig. 3, the solenoid 15 is excited from a source not shown. The switches 3 and 24 which are fastened to the shaft 16 will be opened, but the switch 11 does not open immediately. Thus, with the opening of the switch 3 the saturable core reactor 7 is placed in series with the load 2. Since the core of the reactor 7 is highly saturated at the instant the switches 3 and 24 are opened, the impedance of the reactor 7 will be very small and little or no arcing will occur at the switch 3. The opening of the switch 24 removes the transformer 23 from the line. When this happens the flow of saturating current through the coil 9 decays. At the instant the switches 3 and 24 are opened a low impedance reactor 7 is serially connected to the load. The saturating flux within the core 10 gradually dissipates itself and the impedance of the reactor 7 increases, causing a decrease in the load current. This increase in reactor impedance continues until the core 10 is unsaturated. The load current is then of a sufficiently small value to allow the switch 11 to be opened without danger of excessive arcing.

While there has been shown and described particular embodiments of this invention it will be obvious to those skilled in the art that various changes and modifications can be made therein without departing from the invention; and, therefore, it is aimed in the appended claims to cover all such changes and modifications as fall within the true spirit and scope of the invention.

What I claim as new and desire to secure by Letters Patent of the United States is:

1. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, said second switch and said alternating current winding coupled in parallel with said first switch, and means operative coincidentally with the opening of said first switch for regulating the degree of saturation of the core of said saturable core reactor from an initial saturated condition to a desaturated condition.

2. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, said second switch and said alternating current winding coupled in parallel with said first switch, a transformer coupled with said load such that the output from said transformer is responsive to variations in impedance of said alternating current winding, rectifying means coupled to the output of said transformer and supplying a rectified signal to a direct current saturating winding of said reactor.

3. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, a capacitor and a resistance serially connected and coupled in parallel with said alternating current winding, the combination of said second switch, said alternating current winding, said capacitor and said resistance being coupled in parallel with said first switch, a transformer coupled with said load such that the output from said transformer is responsive to variations in impedance of said alternating current winding, rectifying means coupled to the output of said transformer and supplying a rectified signal to a direct current saturating winding of said reactor.

4. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, said second switch and said alternating current winding coupled in parallel with said first switch, a transformer coupled in parallel with said load and the output from said transformer being responsive to variations in the voltage across said load, rectifying means coupled to the output of said transformer and supplying a rectified signal to a direct current saturating winding of said reactor.

5. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, said second switch and said alternating current winding coupled in parallel with said first switch, a transformer serially connected with said load and the output from said transformer being responsive to variations in the current through said load, rectifying means coupled to the output of said transformer in supplying a rectified signal to a direct current saturating winding of said reactor.

6. In a high current circuit including a power source and a load coupled thereacross, the switching system comprising a first switch serially connected with said source and said load, a second switch, means for opening said first switch before said second switch, a saturable core reactor, said second switch being serially connected with an alternating current winding of said reactor, said second switch and said alternating current winding coupled in parallel with said first switch, a transformer, a third switch, said transformer and said third switch serially connected across said power source, said third switch being coupled to operate with said first switch, rectifying means coupled to the output of said transformer and supplying a rectified signal to a direct current saturating winding of said reactor.

BURNICE D. BEDFORD.

REFERENCES CITED

The following references are of record in the file of this patent:

UNITED STATES PATENTS

| Number | Name | Date |
| --- | --- | --- |
| 816,468 | Hewlett | May 27, 1906 |
| 1,571,304 | Sindeband et al. | Feb. 2, 1926 |
| 1,611,687 | Sindeband et al. | Dec. 21, 1926 |
| 2,067,143 | Logan | Jan. 5, 1937 |
| 2,333,617 | Smith | Nov. 2, 1943 |
| 2,399,185 | Hedding | Apr. 30, 1946 |

FOREIGN PATENTS

| Number | Country | Date |
| --- | --- | --- |
| 11,168 | Great Britain | Nov. 24, 1904 |
| 514,603 | Germany | Mar. 1, 1929 |
| 407,780 | Great Britain | Mar. 29, 1934 |
| 357,349 | Italy | Mar. 11, 1938 |